O. URBASCH.
PROCESS OF MAKING BODIES FOR SULFURING CASKS AND THE LIKE.
APPLICATION FILED JULY 13, 1911.

1,042,057. Patented Oct. 22, 1912.

Witnesses
H. H. Knight
Ray J. Ernst

Inventor
Ottokar Urbasch
By his attorneys

UNITED STATES PATENT OFFICE.

OTTOKAR URBASCH, OF VIENNA, AUSTRIA-HUNGARY.

PROCESS OF MAKING BODIES FOR SULFURING CASKS AND THE LIKE.

1,042,057.   Specification of Letters Patent.   Patented Oct. 22, 1912.

Application filed July 18, 1911. Serial No. 639,268.

*To all whom it may concern:*

Be it known that I, OTTOKAR URBASCH, chemical engineer, of Vienna, XIII/2 Matznergasse 22, in the Empire of Austria-Hungary, have invented a Process of Making Bodies for Sulfuring Casks and the Like; and I do hereby declare the following to be a full, clear, and exact description of the invention, such as will enable others skilled in the art to which it appertains to make and use the same.

The subject-matter of my invention is an improved process of making bodies for sulfuring casks and the like.

My process substantially consists in impregnating porous artificial stone with sulfur. In this manner the sulfur for disinfecting purposes, in contradistinction to the sulfur now customarily applied to fabrics, is rendered unbreakable and has the additional advantage that, when burning, it does not drop or leave other impurities behind, which is of importance when sulfuring casks and the like.

I will explain my process by way of example with reference to one form of apparatus shown in the accompanying drawing, wherein:—

Figure 1:
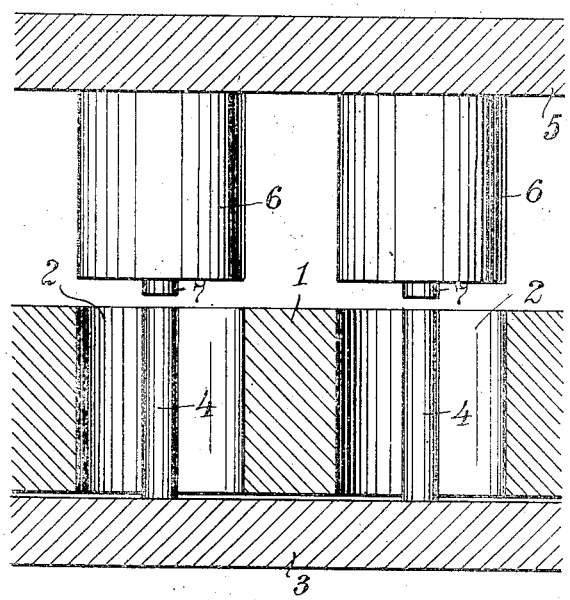
Figure 2:
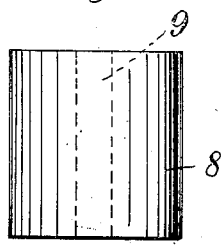
Figure 3:
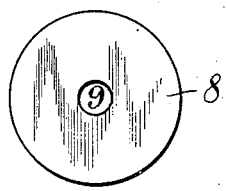

Figure 1 is a vertical cross-section through molds, with which a plurality of hollow cylindrical artificial stones for absorbing sulfur can be simultaneously produced, and Figs. 2 and 3 are elevation and plan, respectively, of a stone made in one of these molds.

The hollow bodies for sulfuring are made by mixing with water materials which harden in the presence of water, such as plaster of Paris, cement and the like, or mixtures thereof, by adding thereto refractory fibrous materials, such as asbestos, and possibly adding porous filling materials such as brick dust, and by filling the pulpy mass thus obtained into the apparatus (Fig. 1) comprising a plurality of like molds, only two of which are shown in Fig. 1. The materials referred to may be advantageously used in the following proportions: Gypsum 99.9% and asbestos fibers 0.1%; or gypsum 98%, cement 1.9% and asbestos fibers 0.1%; or gypsum 80 to 90% and magnesite 10 to 20%.

As shown in Fig. 1, the said apparatus comprises a plate 1 having cylindrical hollow chambers 2, into which cylindrical cores 4 secured to the plate 3 centrically project. The chambers can be closed by the plate 3, so that the pulpy mass contained in the chambers cannot flow out of the same. This mass hardens in the molds, and it is of importance for regulating the work to cause the mass to set within a suitable time, which may be brought about by mixing with the pulpy mass known admixtures such as borax, alcohol, and the like. When the mass has hardened in the molds, the plate 3 and the cores 4 are removed from the castings, whereupon all the absorbent stones are pushed out of the chambers 2 at once by means of the rams 6 secured to the plate 5. In order that the upper part of the absorbent body may not be deformed during the last described operation, the rams 6 have short cylindrical projections 7 which fit into the central holes in the absorbent bodies. These bodies or stones 8 are thereupon dried, then impregnated with sulfur and left in this condition for a while in a chamber having a temperature which is slightly above the melting point of sulfur, in order that any surplus sulfur which may have been absorbed may drop off. When the stones 8 have cooled they are ready for sulfuring. For this purpose and before their ignition a wire is drawn through the holes 9 (Figs. 2 and 3) and the stones are suspended in a cask or the like. They burn without any sulfur dropping off them or any particles of the stones breaking away, because the stones are held together by the refractory fibers. In order to obtain stones having a hollow cylindrical form, by means of suitable molds long tubular bodies may first be made which are then sawn or cut up to the desired lengths.

What I claim as my invention and desire to secure by Letters Patent is:

1. The hereindescribed process of making bodies for sulfuring casks and the like, which consists in mixing with water materials which harden in the presence of water, in adding thereto a refractory fibrous material, whereby a pulpy mass is obtained, in molding the pulpy mass into the form of hollow cylinders, in drying the cylinders, in impregnating the same with sulfur, and in subsequently heating the impregnated cylinders to a temperature above the melting point of sulfur, substantially as described.

2. The hereindescribed process of making bodies for sulfuring casks and the like, which consists in mixing with water materials which harden in the presence of water, in adding thereto a refractory fibrous material and a porous filling material, whereby a pulpy mass is obtained, in molding the pulpy mass into the form of hollow cylinders, in drying the cylinders, in impregnating the same with sulfur, and in subsequently heating the impregnated cylinders to a temperature above the melting point of sulfur, substantially as described.

3. The hereindescribed process of making bodies for sulfuring casks and the like, which consists in mixing with water materials which harden in the presence of water, in adding thereto a refractory fibrous material, brick dust and borax, whereby a pulpy mass is obtained, in molding the pulpy mass into the form of hollow cylinders, in drying the cylinders, in impregnating the same with sulfur, and in subsequently heating the impregnated cylinders to a temperature above the melting point of sulfur, substantially as described.

4. The hereindescribed process of making bodies for sulfuring casks and the like, which consists in mixing with water materials which harden in the presence of water, in adding thereto a refractory fibrous material, whereby a pulpy mass is obtained, in molding the pulpy mass into the form of a long tube, in cutting the tube into a plurality of cylinders of suitable length, in drying the cylinders, in impregnating the same with sulfur, and in subsequently heating the impregnated cylinders to a temperature above the melting point of sulfur, substantially as described.

In testimony whereof I have signed my name to this specification in the presence of two subscribing witnesses.

OTTOKAR URBASCH.

Witnesses:
 ALBIN SCHILLER,
 AUGUST FUGGER.